(12) United States Patent
Ojeda

(10) Patent No.: US 10,300,992 B2
(45) Date of Patent: May 28, 2019

(54) MARITIME TRANSPORT SYSTEM FOR OIL AND DERIVATIVES THEREOF

(71) Applicant: Carlos Alberto Ojeda, Ciudad Autonoma de Buenos Aires (AR)

(72) Inventor: Carlos Alberto Ojeda, Ciudad Autonoma de Buenos Aires (AR)

( * ) Notice: Subject to any disclaimer, the term of this patent is extended or adjusted under 35 U.S.C. 154(b) by 0 days.

(21) Appl. No.: 15/754,021

(22) PCT Filed: Mar. 23, 2016

(86) PCT No.: PCT/IB2016/051663
§ 371 (c)(1),
(2) Date: Feb. 21, 2018

(87) PCT Pub. No.: WO2017/163110
PCT Pub. Date: Sep. 28, 2017

(65) Prior Publication Data
US 2018/0237107 A1 Aug. 23, 2018

(51) Int. Cl.
*B63B 1/34* (2006.01)
*B63B 3/08* (2006.01)
*B63B 25/12* (2006.01)
*B63B 35/68* (2006.01)
*F17C 13/08* (2006.01)
(Continued)

(52) U.S. Cl.
CPC ............... *B63B 1/34* (2013.01); *B63B 1/047* (2013.01); *B63B 3/08* (2013.01); *B63B 21/62* (2013.01); *B63B 25/12* (2013.01); *B63B 35/68* (2013.01); *F17C 13/08* (2013.01); *B63B 2722/00* (2013.01); *Y02T 70/121* (2013.01)

(58) Field of Classification Search
CPC ......... B63B 25/00; B63B 25/08; B63B 25/12; B63B 35/00; B63B 35/28; B63B 35/44; B63B 35/68; B63B 1/34; B63B 3/08
USPC ................ 114/72, 73, 74 A, 74 R, 74 T, 256
See application file for complete search history.

(56) References Cited

U.S. PATENT DOCUMENTS 3,882,809 A 5/1975 Johnson et al.
4,095,546 A 6/1978 Kane
(Continued)

FOREIGN PATENT DOCUMENTS

DE 3230781 2/1984
GB 2181996 5/1987
WO WO2012056107 5/2012

*Primary Examiner* — Lars A Olson
(74) *Attorney, Agent, or Firm* — Defillo & Associates; Evelyn A Defillo

(57) ABSTRACT

The invention relates to a maritime transport system for oil and the derivatives thereof, which includes a tractor unit with a device for driving at least one floating, rotary spheroid container. The at least one container has two semi-spherical domes, an upper one and a lower one, that are closed at the base end and open at the other, the base of each containing a flat surface. Both domes are assembled with the open ends facing one another and are joined at the circular perimeter thereof by a fitting belt with securing device and a gasket, both being solidly joined together. Inside the container are disposed an upper structure and a lower structure that are solidly connected to connecting beams, defining a self-supporting cube-shaped cage with projecting rotating devices and multiple individual housing cells for at least one tank of fluid to be transported.

8 Claims, 7 Drawing Sheets

(51) Int. Cl.
*B63B 1/04* (2006.01)
*B63B 21/62* (2006.01)

(56) References Cited

U.S. PATENT DOCUMENTS

| | | | | |
|---|---|---|---|---|
| 4,438,719 A | * | 3/1984 | Finsterwalder | B63B 25/12 |
| | | | | 114/256 |
| 4,688,505 A | * | 8/1987 | Yang | B63B 35/28 |
| | | | | 114/256 |
| 6,321,673 B2 | | 11/2001 | Lelan | |

* cited by examiner

MARITIME TRANSPORT SYSTEM FOR OIL AND DERIVATIVES THEREOF

CROSS REFERENCE TO RELATED APPLICATION

This application is a national stage entry of PCT/IB2016/051663 filed Mar. 23, 2016, under the International Convention.

TECHNICAL FIELD OF THE INVENTION

The present invention refers to a "Maritime transport system of petroleum and its derivatives", and is related to the sea, rivers, and other similar branch of petroleum and its by-products such as asphalt, fuel-oil, naphtha, etc.

STATE OF THE ART AND INNOVATIVE SOLUTION

In general and as it is known, the merchant transport ships are known and within them there are general cargo vessels, bulk carriers, oil tankers, methane tankers, chemical carriers, container ships, refrigerated ships, barge boats carrying vehicles and others (an illustrative example is cited in U.S. Pat. Nos. 3,882,809 A, 4,095,546 A, 6,321,673 B2).

Particularly, the oil tankers carrying cargoes that are divided into heavy or dirty (crude, asphalt, fuel oil) and light or clean, such as gasoline and other combustible liquid products and distillate cracking. These ships carry the previously mentioned cargo above cargo or fuel tanks that are found inside the ship and must have double hulls. For this, they need big engines with high fuel consumption because the hulls of these ships must turn off the water to move over it and the water skims all living ship work (which is under water) generates resistance to the advance to be overcome by applying power to the propellers through different types of engines.

The greater the length (long), greater the beam (wide) and the greater the draft (depth that is submerged) of the ship, this friction is greater. A greater the transport capacity of a ship, the greater is also the increase of these dimensions and therefore the friction area of the boat with the water increases and therefore also the power and fuel consumption, necessary to move at cruising speeds used in current world trade. This increase in fuel generates higher costs and also generates greater production of greenhouse gases.

The ecological problem caused by accidents in the water transport of this type of cargo, both sea and river, must also be considered. The oil spill causes environmental damage that is difficult to repair, with the consequent increase in insurance premiums and possible legal trials and their associated costs, in addition to the loss of cargo. Different circumstances that arise during the journey from a point of origin to a point of arrival can produce these spills, such as storms, catastrophic events, collisions, stranding, etc.

All these difficulties and disadvantages and consequently low yields, of its vessels, are overcome by the new transport system of the invention, which is simple in the construction and also has an easy assembly due to the reduced numbers of parts and shapes from the same.

The problem posed has led to think that the solution has to do with avoiding friction between water and the object that transports the oil or its derivatives. The transport system of the invention solves this problem, where the following advantages are obtained:

a) The friction is eliminated along a predetermined area and fixed (the hull of the ship) that is replaced by the friction of the water on an autonomous body, spherical, flat base that rotates while the tractor boat is moving forward, drastically reducing the friction that must be overcome to linearly move the load carrying spherical containers.

b) Greater transport capacity is obtained with equal power.

c) Lower fuel consumption is obtained with equal distance and tons of petroleum or petroleum derivatives.

d) Better chance to cross the Panama Canal with the same amount of tons transported by the largest oil tankers with lengths of 300 meters or more, they are unable to do so, restricting their routes or lengthening them excessively.

e) Greater range of options in the handling of containers upon arrival ports. Since the use of discharge conveyors spherical containers of all containers transport and in turn connect on the tractor boat new spherical conveyors and continue to other destinations without losing much time in the operation.

f) Possibility of extracting tanks carrying oil or its derivatives from spheroidal transport containers in port for clean ones out of the water.

g) Ability to change dirty tanks on conveyors spheroidal containers in the port for other clean ones.

h) Reduction of the waiting time in the port, which leads to a reduction in freight costs.

i) Less possibility of spillage and the possibility of recovering the cargo transported in case of storms or catastrophes.

BRIEF DESCRIPTION OF THE FIGURES

In all the figures, the same reference numbers indicate the same or corresponding elements, they are.

DETAILED DESCRIPTION OF THE INVENTION

Figure 1:
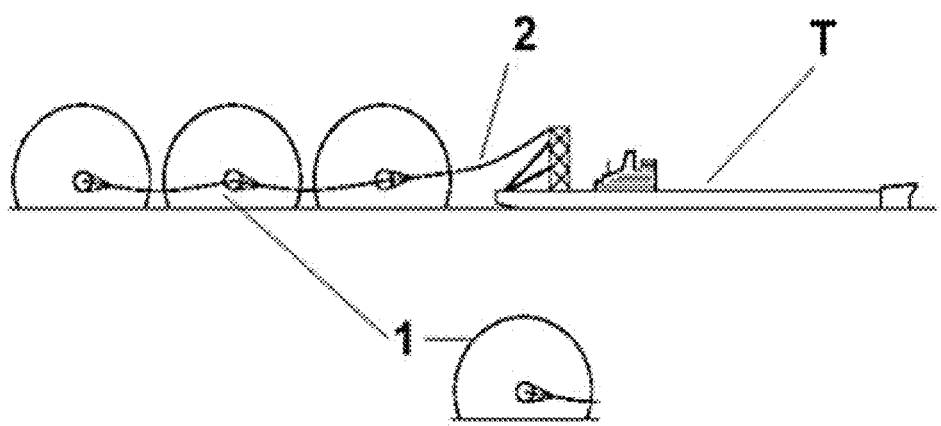
FIG. 1 shows a schematic view of the transport system of the invention that is to be protected.

In all the figures, the components of the transport system are:

T Tractor unit.
1) Floating main spheroidal container volume.
2) Pulling device
3) Upper hemispherical cap.
4) Lower hemispheric cap.
5) Flat surface of the cap (3).
6) Flat surface of the cap (4).
7) Belt locking.
8) Sealing gasket.
9) Moving part of the bearing.

10) Fixed part of the bearing.
11) Cord-type connection device.
12) Chain.
13) Bearing.
14) Lower structure of the self-supporting tank.
15) Rotating device.
16) Lubrication bath level.
17) Rotating device, emerging and arranged in the vertices of a cube structure cage.
18) Individual tank of the material to be transported.
19) Gripping or clamping device
20) Belt locking of the upper hemispherical cap (3).
21) Belt locking of the lower hemispherical cap (4).
22) Inert gas conduit.
23) Filling/emptying conduit of the tank unit.
24) Heating conduit of the tank unit.
25) Upper structure self-supporting unit tank.
26) Connection beams between the lower beam structure (14) and upper structure (25).
27) Damper mechanism and connection between the lower structure (14) and rotating device (15) mechanism.
28) For accommodation of individual fluid transport tank belonging to the lower structure (14) Cells.
29) Securing device arranged in a latching belt formed by both caps (20 and 21).

With reference to FIG. 1, the container transport system comprises a tractor unit (T) with traction device (2) of at least one autonomous main container (1), of spheroidal volume, where said spheroid body rotates, which is in contact with the water and when moving in a straight line, pulled by said tractor unit, the force of friction of the water on the sphere generates its rotation.

Figure 2:
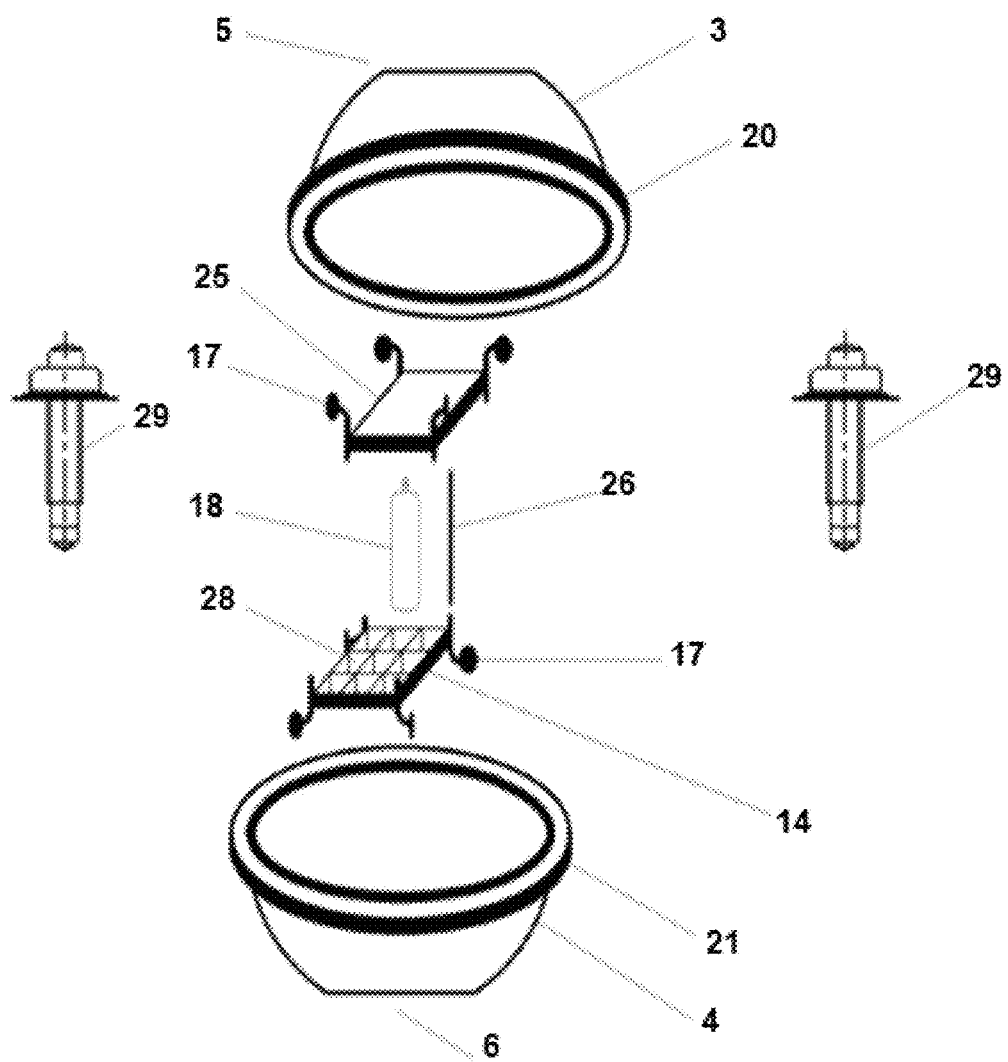
FIG. 2 shows an exploded view of a main container of the transport system.

With respect to FIG. 2, shows that the main container (1) has two hemispherical caps, one upper and one lower (3, 4), with a closed bottom and another open end, in whose bottom each contains a flat surface (5, 6); both caps are faced by their open ends and are joined in their circular perimeter by securing device (29) and sealing gasket (8) being both integral with each other, forming a spheroidal volume.

Figure 3:
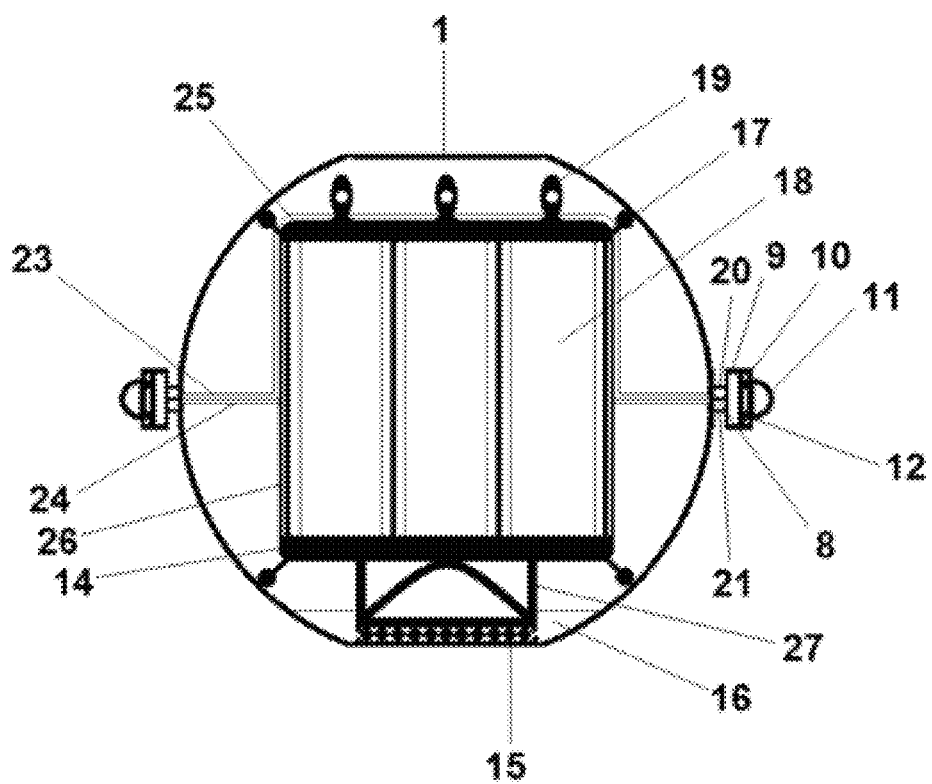
FIG. 3 shows a frontal view of the main container section of the transport system.
Figure 4:
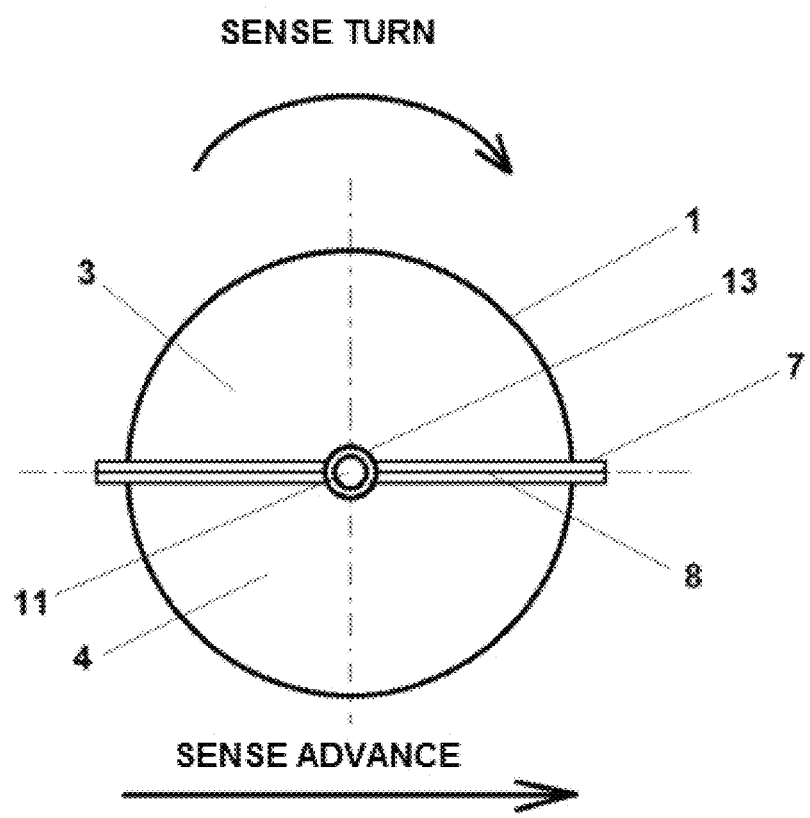
FIG. 4 shows a side view of the main container of the transport system with its directions of rotation and advancement.

In FIG. 3, a lower structure of the self-supporting tank (14), individual tank (18) of the material to be transported, where it contains an upper and lower structure (25, 14) with connecting beams (26) in their assembly, defining a cube with rotating device (15) and self-supporting with multiple individual cells of housings of at least one tank (18) of fluid to be transported.

The self-supporting structure includes a damper mechanism (27) associated with said rotating device (15).

Traction on the spherical container (1) is exerted on the fixed part of a set of bearings (9, 10 and 13) via two cord-type connection devices (11) in each of them a drag chain by a hole through which the chain passes. The moving part of the bearing (9) which is integrally joined to the spherical container (1) by fastening nuts, allows its rotation.

Figure 5:
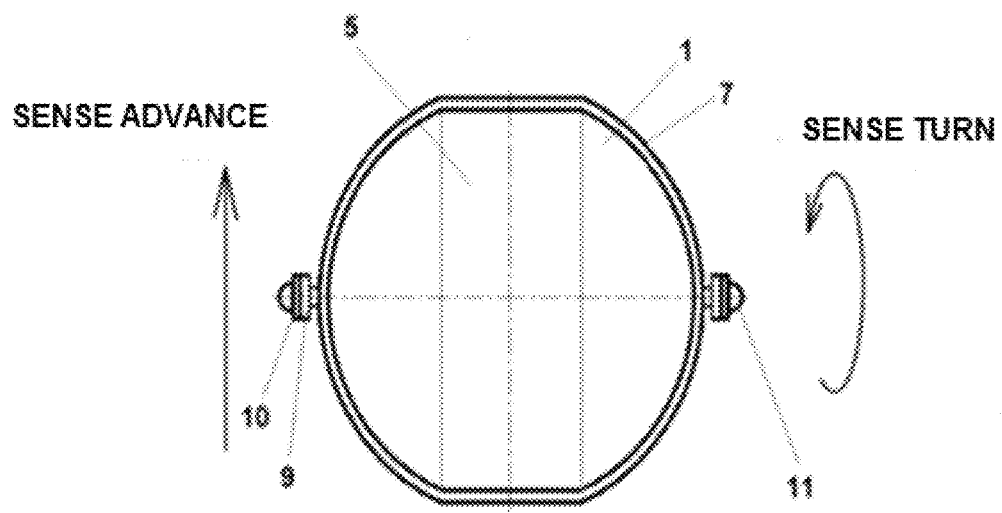
FIG. 5 shows a top view of the main container of the transport system with its directions of rotation and advancement.

The self-supporting structure (14, 25) is loaded into the cap (4) that is in contact with the water, on the flat surface (5) and then binds the other cap (3), both being adjusted by means of a belts locking (20, 21) with securing device (29) and sealing gasket (7, 8) and the two caps now forming a single spherical container (1). (See FIG. 5). In addition said at least one fluid tank has a gripping or clamping device (19) for its handling.

Figure 6:
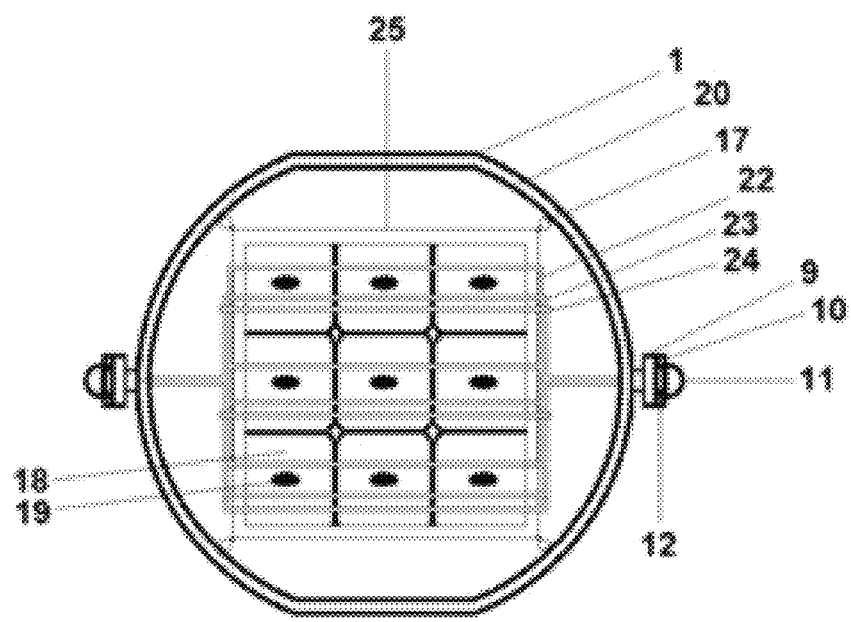
FIG. 6 shows a top view according to a medial section transverse to the advance line of the spheroidal conveyor.
Figure 7:
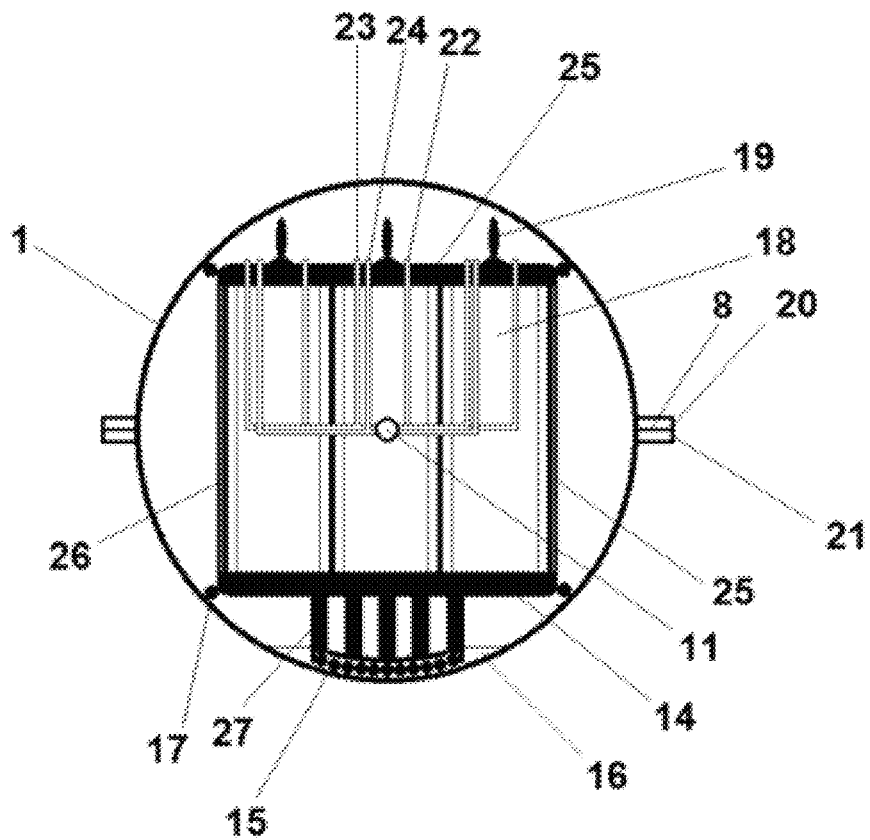
FIG. 7 shows a side view according to a medial section parallel to the advance line of the spheroidal conveyor.

Also said at least one fluid tank has a filling/emptying conduit (23) of said fluid, a heating conduit (24), and an inert gas conduit (22). (See FIGS. 6 and 7).

Also said at least one floating and rotating spherical container (1), is associated with each other, with other containers of similar characteristic, by traction linkage and forming a consecutive row thereof.

Basically the external spherical container structure rolls by action of the passage of the water under its submerged part, while the cage of individual tanks in its place of shelter, remain fixed and stable. By moving the outer spheroidal structure simulates the behavior of a tire on the surface by which it rolls, in this case the water, instead of being a rigid tire that has to be forced to move along the same surface crawling. This circular movement reduces friction.

The invention claimed is:

1. A system transport of oil and derivatives of oil comprising:
    a traction device designed to be connected to a tractor unit, the traction device including at least one floating spheroidal container, the at least one floating spheroidal container rotates on contact with water via a bearing assembly;
    wherein each one of said floating spheroidal container has an upper hemispherical cap, and a lower hemispherical cap, each one of the upper and lower hemispherical caps includes a closed bottom, and an open top, and a flat surface on the closed bottom;
    the upper hemispherical cap and the lower hemispherical cap are connected by the open ends forming a spheroidal body;
    a securing device and a sealing gasket both being integral with each other are located at the connection of the hemispherical caps;
    a self-supporting tank located inside the spheroidal body, the self-supporting tank including a lower structure, an upper structure, connecting beams to connect the lower and upper structures forming a cube structure;
    at least one fluid tank placed inside the self-supporting tank;
    a rotating device located at the lower structure of the self-supporting tank.

2. The system shipping according to claim 1, wherein said at least one fluid tank has a gripping or clamping device for handling.

3. The system shipping according to claim 1, wherein said at least one fluid tank has a filling/emptying conduit.

4. The system shipping according to claim 1, wherein said at least one fluid tank has a heating conduit.

5. The system shipping according to claim 1, wherein said at least one fluid tank has an inert gas conduit.

6. The system shipping according to claim 1, further including rotating rollers arranged at each vertex of said cube structure.

7. The system shipping according to claim 1, wherein the system includes several floating spheroidal containers forming a straight row of the same.

8. The system shipping, according to claim 1, wherein the self-supporting structure includes a damper mechanism associated with a rotating device.

* * * * *